(12) United States Patent
Johnson et al.

(10) Patent No.: US 11,479,414 B2
(45) Date of Patent: Oct. 25, 2022

(54) DYNAMIC ITEM PUTAWAY MANAGEMENT USING MOBILE ROBOTS

(71) Applicant: Locus Robotics Corp., Wilmington, MA (US)

(72) Inventors: Sean Johnson, Danvers, MA (US); Luis Jaquez, Burlington, MA (US); Michael Charles Johnson, Ashland, MA (US)

(73) Assignee: Locus Robotics Corp., Wilmington, MA (US)

(*) Notice: Subject to any disclaimer, the term of this patent is extended or adjusted under 35 U.S.C. 154(b) by 2 days.

(21) Appl. No.: 17/017,766

(22) Filed: Sep. 11, 2020

(65) Prior Publication Data

US 2022/0081215 A1    Mar. 17, 2022

(51) Int. Cl.
  *B65G 1/137* (2006.01)
  *B65G 1/04* (2006.01)
  *B65G 1/06* (2006.01)
  *G05D 1/02* (2020.01)

(52) U.S. Cl.
  CPC ......... *B65G 1/1378* (2013.01); *B65G 1/0492* (2013.01); *B65G 1/065* (2013.01); *G05D 1/0212* (2013.01); *G05D 2201/0216* (2013.01)

(58) Field of Classification Search
  CPC combination set(s) only.
  See application file for complete search history.

(56) References Cited

U.S. PATENT DOCUMENTS

| | | | |
|---|---|---|---|
| 4,678,390 A | 7/1987 | Bonneton et al. | |
| 6,764,373 B1 * | 7/2004 | Osawa | G05D 1/0234 446/454 |
| 7,751,928 B1 * | 7/2010 | Antony | G06Q 10/087 700/214 |
| 8,731,708 B2 * | 5/2014 | Shakes | B65G 1/1378 700/216 |
| 9,120,622 B1 * | 9/2015 | Elazary | B25J 9/1697 |
| 9,463,927 B1 * | 10/2016 | Theobald | B65G 1/1373 |
| 9,466,046 B1 | 10/2016 | Theobald | |

(Continued)

FOREIGN PATENT DOCUMENTS

EP    0 235 488    9/1987

OTHER PUBLICATIONS

International Searching Authority/EP, International Search Report and Written Opinion of the International Searching Authority, Application No. PCT/US2021/049236, dated Nov. 29, 2021, 16 pages.

(Continued)

*Primary Examiner* — Kyle O Logan
(74) *Attorney, Agent, or Firm* — Sunstein LLP

(57) ABSTRACT

Processes are provided for dynamically sorting and storing items in a warehouse without the need for presorting items and without delaying or negatively impacting the efficiency of operators in the warehouse. Items are individually scanned and placed in totes of a tote-array provided on a mobile robot. An optimized route is calculated based on the items in the tote-array, and the robot navigates to a first location on the route. When the item has been put away, a replacement item is placed in the just-emptied tote of the tote-array, and an updated route is calculated. A robot capable of navigating to predefined locations for storing items is a warehouse is provided.

15 Claims, 14 Drawing Sheets

(56) References Cited

U.S. PATENT DOCUMENTS

| | | |
|---|---|---|
| 9,829,333 B1 | 11/2017 | Calder |
| 10,282,696 B1 | 5/2019 | Bettis et al. |
| 10,489,870 B2 | 11/2019 | Asaria et al. |
| 2012/0330458 A1* | 12/2012 | Weiss ............... G05B 19/41895 901/1 |
| 2013/0317642 A1* | 11/2013 | Asaria ................... G06Q 10/08 700/216 |
| 2014/0350725 A1* | 11/2014 | LaFary ................ G05D 1/0274 901/50 |
| 2015/0073589 A1* | 3/2015 | Khodl ..................... B25J 5/007 700/218 |
| 2015/0332213 A1* | 11/2015 | Galluzzo .............. G05D 1/0248 700/218 |
| 2017/0158431 A1 | 6/2017 | Hamilton et al. |
| 2017/0183159 A1* | 6/2017 | Weiss ....................... B66F 9/063 |
| 2017/0274531 A1* | 9/2017 | Johnson ............... G06Q 10/087 |
| 2018/0029797 A1 | 2/2018 | Hance et al. |
| 2018/0043533 A1* | 2/2018 | Johnson ............... G06Q 10/087 |
| 2018/0059635 A1* | 3/2018 | Johnson ............... B65G 1/1373 |
| 2018/0370728 A1* | 12/2018 | Gallagher ............ G05D 1/0291 |
| 2019/0094876 A1* | 3/2019 | Moore ................... G05D 1/024 |
| 2020/0051195 A1* | 2/2020 | Asaria .................... G06Q 50/28 |
| 2020/0202285 A1* | 6/2020 | Elazary ................ B65G 1/1375 |
| 2020/0239232 A1 | 7/2020 | Johnson et al. |
| 2022/0135084 A1* | 5/2022 | Choi ....................... H04W 4/46 701/2 |
| 2022/0171988 A1* | 6/2022 | Ma ........................ G06K 9/6223 |

OTHER PUBLICATIONS

International Searching Authority/EP, International Search Report and Written Opinion of the International Searching Authority, Application No. PCT/2021/049563, dated Jan. 7, 2022, 12 pages.

S. Johnson et al., *Presort System for Executing Robot-Assisted Putaway Tasks*, U.S. Appl. No. 17/017,833, filed Sep. 11, 2020, 52 pages.

United States Patent and Trademark Office, Office Action, U.S. Appl. No. 17/017,833, dated Aug. 16, 2022, 35 pages.

* cited by examiner

| Fiducial ID | x | y | z | quaternion.x | quaternion.y | quaternion.z | quaternion.w |
|---|---|---|---|---|---|---|---|
| 1 | -10.2 | 2.3 | 0 | 0 | 0 | 0 | 1 |
| 2 | 23.1 | 15.8 | 0 | 0 | 0 | 0 | 1 |
| 3 | 45.3 | 3.3 | 0 | 0 | 0 | -1 | 0 |

| Location | Fiducial ID |
|---|---|
| L01001A | 11 |
| L01001B | 11 |
| L01001C | 11 |
| L01001D | 11 |
| L01001E | 11 |
| L01001F | 11 |
| L01002A | 12 |
| L01002B | 12 |
| L01002C | 12 |
| L01002D | 12 |
| L01002E | 12 |
| L01003A | 13 |
| L01003B | 13 |
| L01003C | 13 |
| L01003D | 13 |
| L01003E | 13 |
| L01003F | 13 |
| L01004A | 14 |
| L01004B | 14 |
| L01004C | 14 |
| L01004D | 14 |
| L01004E | 14 |
| L01005A | 15 |
| L01005B | 15 |
| L01005C | 15 |
| L01005D | 15 |
| L01005E | 15 |
| L01005F | 15 |

FIG. 7

DYNAMIC ITEM PUTAWAY MANAGEMENT USING MOBILE ROBOTS

FIELD OF THE INVENTION

This invention relates to warehouse stocking or putaway operations using mobile robots and more particularly to dynamic item putaway management with optimized mobile robot routing.

BACKGROUND OF THE INVENTION

Ordering products over the internet for home delivery is an extremely popular way of shopping. Fulfilling such orders in a timely, accurate and efficient manner is logistically challenging to say the least. Clicking the "check out" button in a virtual shopping cart creates an "order." The order includes a listing of items that are to be shipped to a particular address. The process of "fulfillment" involves physically taking or "picking" these items from a large warehouse, packing them, and shipping them to the designated address. An important goal of the order-fulfillment process is thus to ship as many items in as short a time as possible.

The order-fulfillment process typically takes place in a large warehouse that contains many products, including those listed in the order. Among the tasks of order fulfillment is therefore that of traversing the warehouse to find and collect the various items listed in an order. In addition, the products that will ultimately be shipped first need to be received in the warehouse and stored or "placed" in storage bins in an orderly fashion throughout the warehouse so they can be readily retrieved for shipping.

In a large warehouse, the goods that are being delivered and ordered can be stored in the warehouse very far apart from each other and dispersed among a great number of other goods. With an order-fulfillment process using only human operators to place and pick the goods requires the operators to do a great deal of walking and can be inefficient and time consuming. Since the efficiency of the fulfillment process is a function of the number of items shipped per unit time, increasing time reduces efficiency.

In order to increase efficiency, robots may be used to perform functions of humans or they may be used to supplement the humans' activities. For example, robots may be assigned to to "pick" items from various locations dispersed throughout the warehouse for packing and shipping. The picking may be done by the robot alone or with the assistance of human operators. For example, in the case of a pick operation, the human operator would pick items from shelves and place them on the robots or, in the case of a place operation, the human operator would pick items from the robot and place them on the shelves.

Before the orders can be fulfilled, the warehouse must be stocked with the items that can be ordered. In general, warehouse stocking or "putaway" operations, especially where the items are mixed together in a single shipment or group of returned items, is very labor intensive and inefficient. For example, workers may be given a pile of unsorted items on a cart and asked to go item by item to stock them. This results in extensive travel and inefficient routing/manpower usage. The alternative is to have a dedicated group of operators sort the items on delivery, scan each individual item and then place them on a cart for a worker to stock the items for later picking and delivery. This is still inefficient because the items are not necessarily assigned to optimize routing or picker-efficiency and necessarily draw workers away from picking tasks.

BRIEF SUMMARY OF THE INVENTION

Provided herein are systems and processes for robot dynamic putaway selection.

In one aspect, a robotic dynamic putaway selection system is provided. A dynamic putaway selection system can utilize cooperative robot-operator interaction to improve routing and operator efficiencies and minimize upfront effort. This is achieved by providing a mobile robot with a tote-array of a plurality of totes. The tote-array can have a defined number of totes, such as, for example eight (8) totes, although any number can be provided. In some embodiments, the mobile robot may also include an additional tote, larger than each of the totes of the tote-array, to hold a large volume of unsorted, unscanned items. Receiving staff can place a plurality of items to stored in any suitable location, such as in the additional tote, without first presorting the items.

In another aspect, a robotic dynamic putaway selection process is provided, utilizing a mobile robot with a tote-array of a plurality of totes. Initially, for each tote in the tote-array, the receiving staff can scan one item from a plurality of items to be stored, each scanned item to be associated with and placed into a tote of the tote-array. The robot, relying on data from a warehouse management server (WMS) and order-server, then determines an optimal route for putting away the scanned items in the totes of the tote-array. At a first storage location on the route, the robot identifies the first item to be put away, an operator retrieves the first item to be put away, scans the item, places the item on the shelf, and confirms that the item has been put away. The tablet on the robot then prompts the operator to scan a replacement item from the additional tote or other locations to place in the now-empty tote on the tote-array. Once the replacement item has been scanned and placed in the tote-array, the operator confirms task completion and the robot recalculates the most efficient route for the new set of items in the tote-array. The robot then moves to the next location based on the recalculated route. In this manner, the items are dynamically sorted and the robots are being routed as efficiently as possible absent presorting, without delaying or negatively impacting the efficiency of the human operators.

In another aspect, a robot capable of navigating to pre-defined locations in an environment is provided, the robot comprising a mobile base, a tote-array of a plurality of totes supported on the mobile base. The robot includes a communication device enabling communication between the robot and a management system. The robot includes a processor and memory, responsive to communications with the management system, configured to determine a route to deliver each of the items in the tote-array to associated storage locations; navigate to a first storage location for placement of a first item of the items in the tote-array; receive confirmation of placement of the first item in the first storage location; receive identification of a further item for placement in the tote of the tote-array previously occupied by the first item; and determine an updated route to deliver each of the items in the tote-array to associated storage locations.

In some embodiments, the robot further includes an additional tote supported on the mobile base for configured to hold a plurality of items for subsequent placement in the tote-array. The robot may further include a scanner operative to scan the items for placement in the tote-array. The robot may further include a display device for communication with an operator. The robot may be further configured to navigate to the updated route. The processor maybe configured to communicate an identification of the first item for placement at the first storage location to an operator.

These and other features of the invention will be apparent from the following detailed description and the accompanying figures, in which:

BRIEF DESCRIPTION OF THE FIGURES

FIG. 6 is a table of the fiducial identification to pose mapping;

FIG. 7 is a table of the bin location to fiducial identification mapping;

DETAILED DESCRIPTION OF INVENTION

Figure 1:
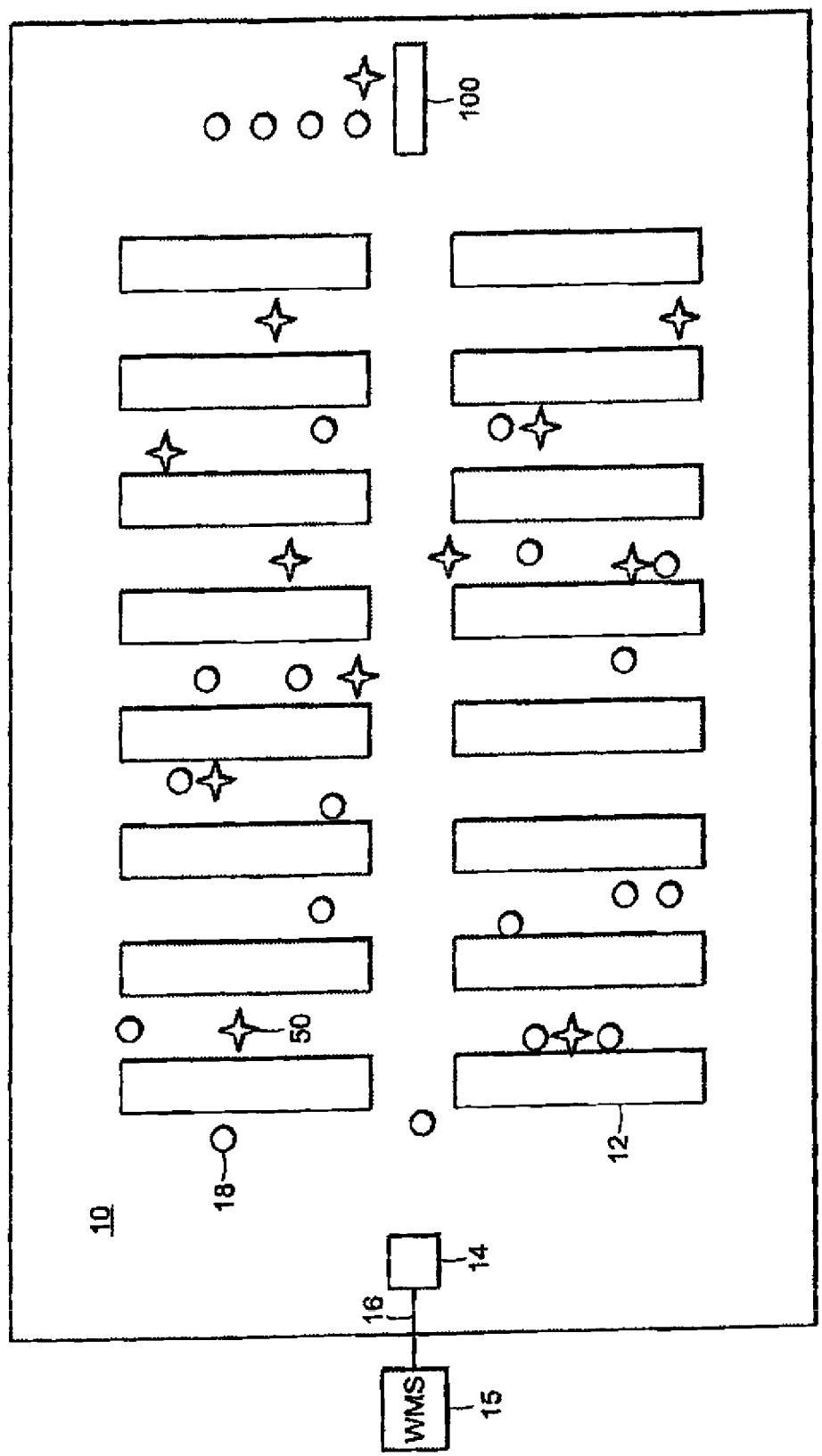
FIG. 1 is a top plan view of an order-fulfillment warehouse.

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

The invention is directed to dynamic item putaway management with optimized mobile robot routing. Although not restricted to any particular robot application, one suitable application that the invention may be used in is order fulfillment. The use of robots in an order fulfillment warehouse will be described to provide context for dynamic item putaway management according to an aspect of the invention. However, it should be noted, that the invention is not limited to this application.

Referring to FIG. 1, a typical order-fulfillment warehouse 10 includes shelves 12 filled with the various items that could be included in an order. In operation, an incoming stream of orders 16 from warehouse management server 15 arrive at an order-server 14. The order-server 14 may prioritize and group orders, among other things, for assignment to robots 18 during an induction process. As the robots are inducted by operators, at a processing station (e.g. station 100), the orders 16 are assigned and communicated to robots 18 wirelessly for execution. It will be understood by those skilled in the art that order server 14 may be a separate server with a discrete software system configured to interoperate with the warehouse management system server 15 and warehouse management software or the order server functionality may be integrated into the warehouse management software and run on the warehouse management server 15.

Figure 2A:
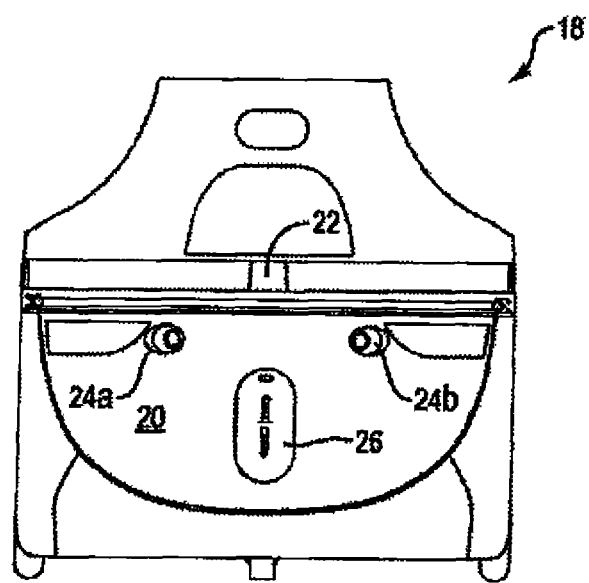
FIG. 2A is a front elevational view of a base of one of the robots used in the warehouse shown in FIG. 1.
Figure 2B:
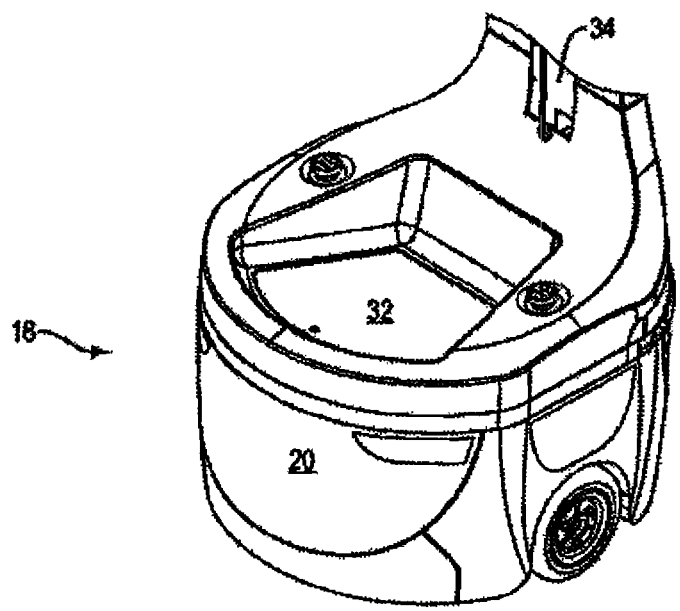
FIG. 2B is a perspective view of a base of one of the robots used in the warehouse shown in FIG. 1.
Figure 3:
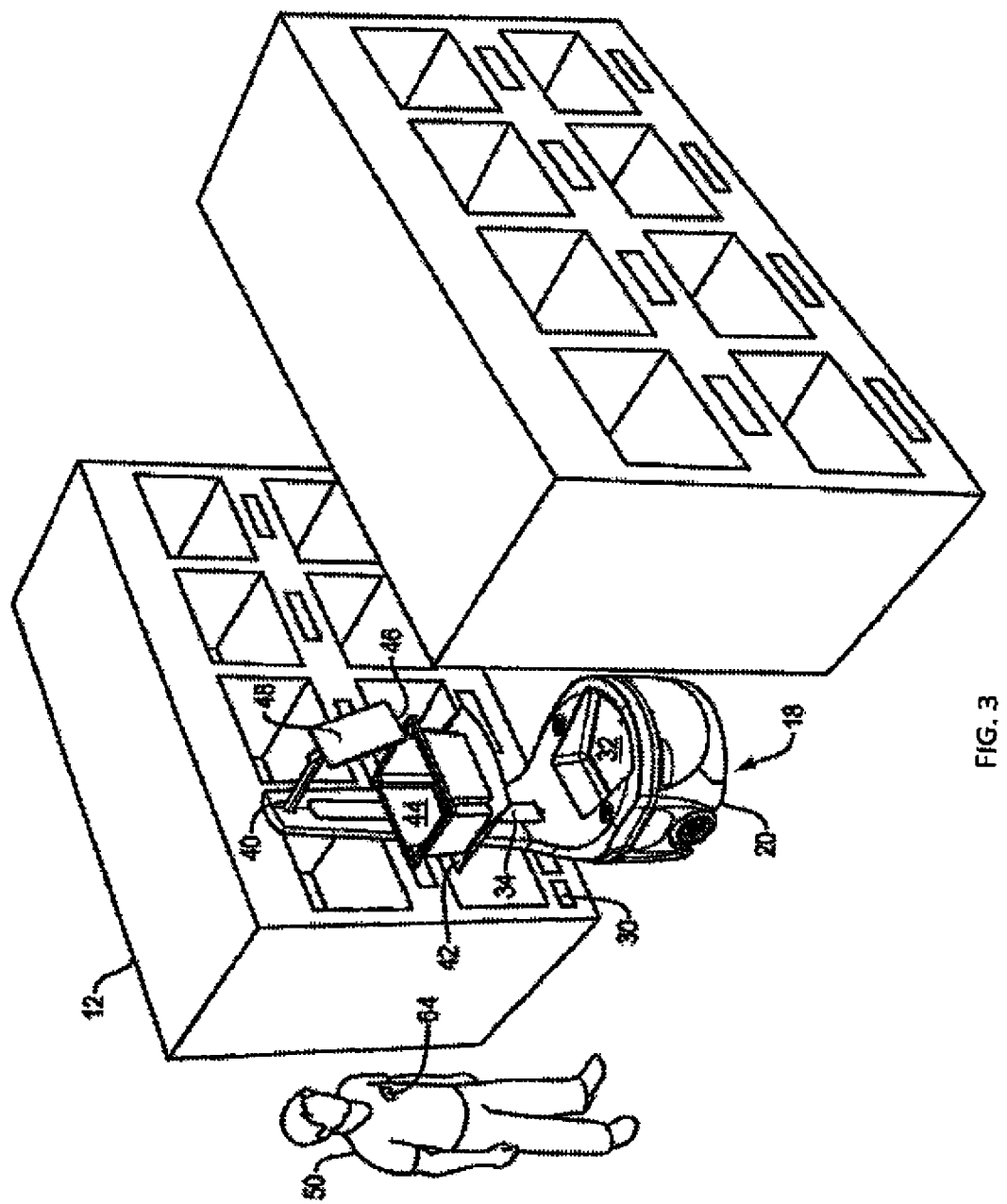
FIG. 3 is a perspective view of the robot in FIGS. 2A and 2B outfitted with an armature and parked in front of a shelf shown in FIG. 1.

In a preferred embodiment, a robot 18, shown in FIGS. 2A and 2B, includes an autonomous wheeled base 20 having a laser-radar 22. The base 20 also features a transceiver (not shown) that enables the robot 18 to receive instructions from and transmit data to the order-server 14 and/or other robots, and a pair of digital optical cameras 24a and 24b. The robot base also includes an electrical charging port 26 for re-charging the batteries which power autonomous wheeled base 20. The base 20 further features a processor (not shown) that receives data from the laser-radar and cameras 24a and 24b to capture information representative of the robot's environment. There is a memory (not shown) that operates with the processor to carry out various tasks associated with navigation within the warehouse 10, as well as to navigate to fiducial marker 30 placed on shelves 12, as shown in FIG. 3. Fiducial marker 30 (e.g. a two-dimensional bar code) corresponds to bin/location of an item ordered. The navigation approach of this invention is described in detail below with respect to FIGS. 4-8. Fiducial markers are also used to identify charging stations according to an aspect of this invention and the navigation to such charging station fiducial markers is the same as the navigation to the bin/location of items ordered. Once the robots navigate to a charging station, a more precise navigation approach is used to dock the robot with the charging station and such a navigation approach is described below.

Referring again to FIG. 2B, base 20 includes an upper surface 32 where a tote or bin could be stored to carry items. There is also shown a coupling 34 that engages any one of a plurality of interchangeable armatures 40, one of which is shown in FIG. 3. The particular armature 40 in FIG. 3 features a tote-holder 42 (in this case a shelf) for carrying a tote 44 that receives items, and a tablet holder 46 (or laptop/other user input device) for supporting a tablet 48. In some embodiments, the armature 40 supports one or more totes for carrying items. In other embodiments, the base 20 supports one or more totes for carrying received items. As used herein, the term "tote" includes, without limitation, cargo holders, bins, cages, shelves, rods from which items can be hung, caddies, crates, racks, stands, trestle, containers, boxes, canisters, vessels, and repositories. There may also be used a tote-array having an array of two or more totes or containers which are affixed to one another or a single unit having multiple compartments. Each of the totes/containers or compartments may be associated with a separate order or multiple totes/containers/compartments may be used for and associated with a single larger order. The description of the operation of the robot 18 with a single tote, described in FIGS. 1-8, is also applicable to a robot with a tote-array.

While the initial description provided herein is focused on picking items from bin locations in the warehouse to fulfill an order for shipment to a customer, the system is equally applicable to the storage or placing of items received into the warehouse in bin locations throughout the warehouse for later retrieval and shipment to a customer. The invention is also applicable to inventory control tasks associated with such a warehouse system, such as, consolidation, counting, verification, inspection and clean-up of products.

Although a robot 18 excels at moving around the warehouse 10, with current robot technology, it is not very good at quickly and efficiently picking items from a shelf and placing them in the tote 44 due to the technical difficulties associated with robotic manipulation of objects. A more efficient way of picking items is to use a local operator 50, which is typically human, to carry out the task of physically removing an ordered item from a shelf 12 and placing it on robot 18, for example, in tote 44. The robot 18 communicates the order to the local operator 50 via the tablet 48 (or laptop/other user input device), which the local operator 50 can read, or by transmitting the order to a handheld device used by the local operator 50.

Upon receiving an order 16 from the order server 14, the robot 18 proceeds to a first warehouse location, e.g. as shown in FIG. 3. It does so based on navigation software stored in the memory and carried out by the processor. The navigation software relies on data concerning the environment, as collected by the laser-radar 22, an internal table in memory that identifies the fiducial identification ("ID") of fiducial marker 30 that corresponds to a location in the warehouse 10 where a particular item can be found, and the cameras 24a and 24b to navigate.

Upon reaching the correct location (pose), the robot 18 parks itself in front of a shelf 12 on which the item is stored and waits for a local operator 50 to retrieve the item from the shelf 12 and place it in tote 44. If robot 18 has other items to retrieve it proceeds to those locations. The item(s) retrieved by robot 18 are then delivered to a processing station 100, FIG. 1, where they are packed and shipped. While processing station 100 has been described with regard to this figure as being capable of inducting and unloading/packing robots, it may be configured such that robots are either inducted or unloaded/packed at a station, i.e. they may be restricted to performing a single function.

It will be understood by those skilled in the art that each robot may be fulfilling one or more orders and each order may consist of one or more items. Typically, some form of route optimization software would be included to increase efficiency, but this is beyond the scope of this invention and is therefore not described herein.

In order to simplify the description of the invention, a single robot 18 and operator 50 are described. However, as is evident from FIG. 1, a typical fulfillment operation includes many robots and operators working among each other in the warehouse to fill a continuous stream of orders.

The baseline navigation approach of this invention, as well as the semantic mapping of a SKU of an item to be retrieved to a fiducial ID/pose associated with a fiducial marker in the warehouse where the item is located, is described in detail below with respect to FIGS. 4-8.

Using one or more robots 18, a map of the warehouse 10 must be created and the location of various fiducial markers dispersed throughout the warehouse must be determined. To do this, one or more of the robots 18 as they are navigating the warehouse they are building/updating a map 10a, FIG. 4, utilizing its laser-radar 22 and simultaneous localization and mapping (SLAM), which is a computational problem of constructing or updating a map of an unknown environment. Popular SLAM approximate solution methods include the particle filter and extended Kalman filter. The SLAM GMapping approach is the preferred approach, but any suitable SLAM approach can be used.

Robot 18 utilizes its laser-radar 22 to create map 10a of warehouse 10 as robot 18 travels throughout the space identifying, open space 112, walls 114, objects 116, and other static obstacles, such as shelf 12, in the space, based on the reflections it receives as the laser-radar scans the environment.

Figure 4:
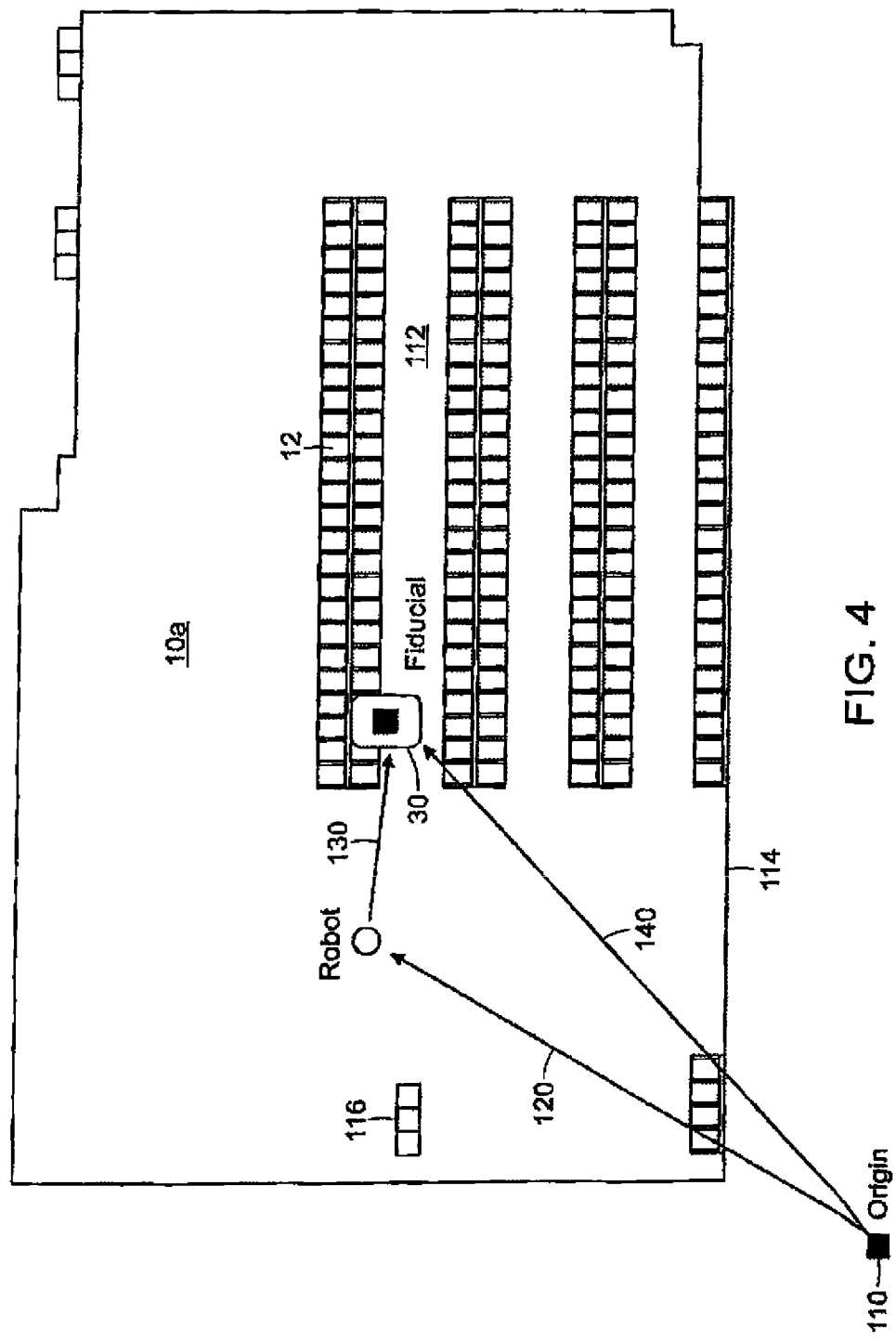
FIG. 4 is a partial map of the warehouse of FIG. 1 created using laser radar on the robot.

While constructing the map 10a (or updating it thereafter), one or more robots 18 navigates through warehouse 10 using camera 26 to scan the environment to locate fiducial markers (two-dimensional bar codes) dispersed throughout the warehouse on shelves proximate bins, such as 32 and 34, FIG. 3, in which items are stored. Robots 18 use a known starting point or origin for reference, such as origin 110. When a fiducial marker, such as fiducial marker 30, FIGS. 3 and 4, is located by robot 18 using its camera 26, the location in the warehouse relative to origin 110 is determined.

By the use of wheel encoders and heading sensors, vector 120, and the robot's position in the warehouse 10 can be determined. Using the captured image of a fiducial marker/two-dimensional barcode and its known size, robot 18 can determine the orientation with respect to and distance from the robot of the fiducial marker/two-dimensional barcode, vector 130. With vectors 120 and 130 known, vector 140, between origin 110 and fiducial marker 30, can be determined. From vector 140 and the determined orientation of the fiducial marker/two-dimensional barcode relative to robot 18, the pose (position and orientation) defined by a quaternion (x, y, z, ω) for fiducial marker 30 can be determined.

Figure 5:
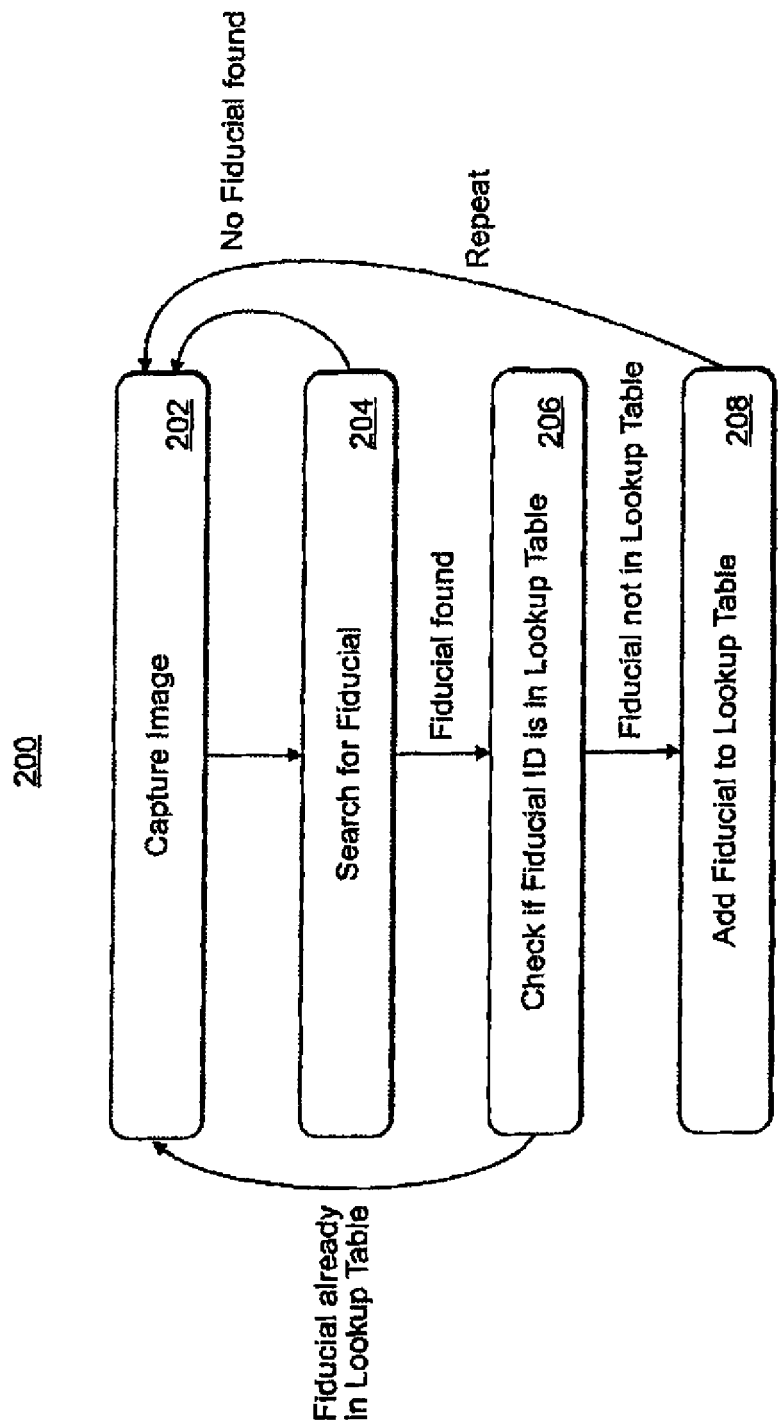
FIG. 5 is a flow chart depicting the process for locating fiducial markers dispersed throughout the warehouse and storing fiducial marker poses.

Flow chart 200, FIG. 5, describing the fiducial marker location process is described. This is performed in an initial mapping mode and as robot 18 encounters new fiducial markers in the warehouse while performing picking, placing and/or other tasks. In step 202, robot 18 using camera 26 captures an image and in step 204 searches for fiducial markers within the captured images. In step 206, if a fiducial marker is found in the image (step 204) it is determined if the fiducial marker is already stored in fiducial table 300, FIG. 6, which is located in memory 34 of robot 18. If the fiducial information is stored in memory already, the flow chart returns to step 202 to capture another image. If it is not in memory, the pose is determined according to the process described above and in step 208, it is added to fiducial to pose lookup table 300.

In look-up table 300, which may be stored in the memory of each robot, there are included for each fiducial marker a fiducial identification, 1, 2, 3, etc., and a pose for the fiducial marker/bar code associated with each fiducial identification. The pose consists of the x,y,z coordinates in the warehouse along with the orientation or the quaternion (x,y,z, ω).

In another look-up Table 400, FIG. 7, which may also be stored in the memory of each robot, is a listing of bin locations (e.g. 402a-f) within warehouse 10, which are correlated to particular fiducial ID's 404, e.g. number "11". The bin locations, in this example, consist of seven alpha-numeric characters. The first six characters (e.g. L01001) pertain to the shelf location within the warehouse and the last character (e.g. A-F) identifies the particular bin at the shelf location. In this example, there are six different bin locations associated with fiducial ID "11". There may be one or more bins associated with each fiducial ID/marker.

The alpha-numeric bin locations are understandable to humans, e.g. operator 50, FIG. 3, as corresponding to a physical location in the warehouse 10 where items are stored. However, they do not have meaning to robot 18. By mapping the locations to fiducial ID's, Robot 18 can determine the pose of the fiducial ID using the information in table 300, FIG. 6, and then navigate to the pose, as described herein.

Figure 8:
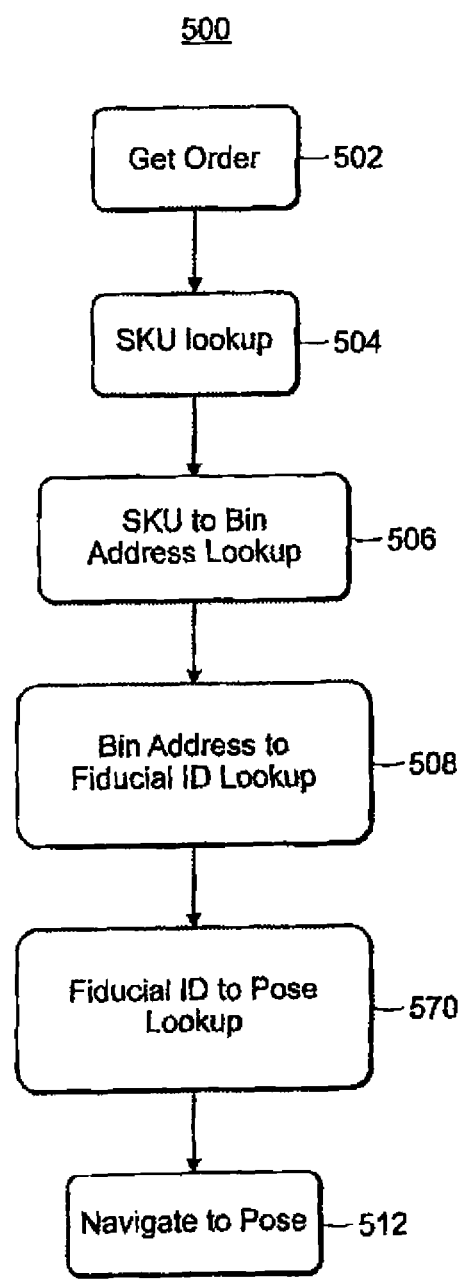
FIG. 8 is a flow chart depicting product SKU to pose mapping process.

The order fulfillment process according to this invention is depicted in flow chart 500, FIG. 8. In step 502, from warehouse management system 15, order server 14 obtains an order, which may consist of one or more items to be retrieved. It should be noted that the order assignment process is fairly complex and goes beyond the scope of this disclosure. One such order assignment process is described in commonly owned U.S. patent application Ser. No. 15/807,672, entitled Order Grouping in Warehouse Order Fulfillment Operations, filed on Sep. 1, 2016, which is incorporated herein by reference in its entirety. It should also be noted that robots may have tote arrays which allow a single robot to execute multiple orders, one per bin or compartment. Examples of such tote arrays are described in U.S. patent application Ser. No. 15/254,321, entitled Item Storage Array for Mobile Base in Robot Assisted Order-Fulfillment Operations, filed on Sep. 1, 2016, which is incorporated herein by reference in its entirety.

Continuing to refer to FIG. 8, in step 504 the SKU number(s) of the items is/are determined by the warehouse management system 15, and from the SKU number(s), the bin location(s) is/are determined in step 506. A list of bin locations for the order is then transmitted to robot 18. In step 508, robot 18 correlates the bin locations to fiducial ID's and from the fiducial ID's, the pose of each fiducial ID is obtained in step 510. In step 512 the robot 18 navigates to the pose as shown in FIG. 3, where an operator can pick the item to be retrieved from the appropriate bin and place it on the robot.

Item specific information, such as SKU number and bin location, obtained by the warehouse management system 15/order server 14, can be transmitted to tablet 48 on robot 18 so that the operator 50 can be informed of the particular items to be retrieved when the robot arrives at each fiducial marker location.

With the SLAM map and the pose of the fiducial ID's known, robot 18 can readily navigate to any one of the fiducial ID's using various robot navigation techniques. The preferred approach involves setting an initial route to the fiducial marker pose given the knowledge of the open space 112 in the warehouse 10 and the walls 114, shelves (such as shelf 12) and other obstacles 116. As the robot begins to traverse the warehouse using its laser radar 26, it determines if there are any obstacles in its path, either fixed or dynamic, such as other robots 18 and/or operators 50, and iteratively updates its path to the pose of the fiducial marker. The robot re-plans its route about once every 50 milliseconds, constantly searching for the most efficient and effective path while avoiding obstacles.

With the product SKU/fiducial ID to fiducial pose mapping technique combined with the SLAM navigation technique both described herein, robots 18 are able to very efficiently and effectively navigate the warehouse space without having to use more complex navigation approaches typically used which involve grid lines and intermediate fiducial markers to determine location within the warehouse.

Robotic Dynamic Putaway Selection Management

Prior to picking items from bin locations in the warehouse to fill an order, the items must first be stored at the proper bin locations on the shelves so that they can be subsequently located. In many cases, a variety of items are delivered to a warehouse mixed together in a single shipment, with no presorting. A variety of returned items may similarly be mixed together with no presorting. Processes and systems are provided to facilitate the stocking of the shelves in a warehouse by dynamically sorting the items, eliminating the need for presorting the items and without delaying or negatively impacting the efficiency of human operators.

Figure 9A:
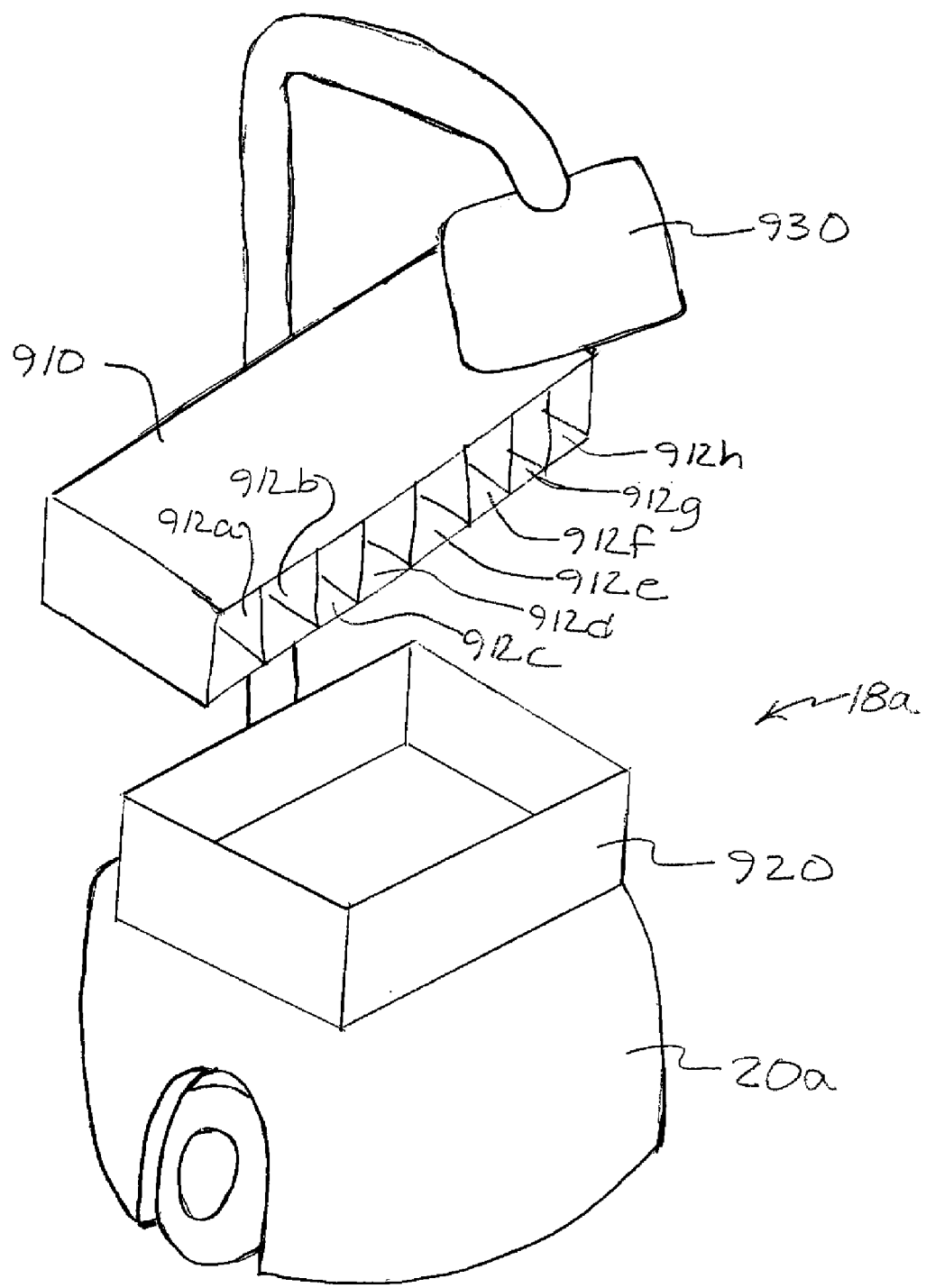
FIG. 9A is a schematic illustration of a robot outfitted with putaway containers according to an aspect of the invention.

Toward this end, FIG. 9A illustrates an embodiment of a mobile robot 18a that can be used to stock the shelves with items in cooperation with operators. In some embodiments, the robot may be outfitted with a tote-array 910 of two or more totes/bins, generally on an upper part of the robot. In the embodiment illustrated in FIG. 9A, eight totes 912a-912h are shown, although it will be appreciated that any number of totes can be provided. In some embodiments, one or more additional totes or bins 920, generally larger than the totes of the tote-array, may be positioned on a base 20a or lower part of the robot below the tote-array. The additional tote is not necessary, but may be preferred for convenient access by an operator for replacing items in the tote-array 910 during the putaway process, as described further below.

Figure 9B:
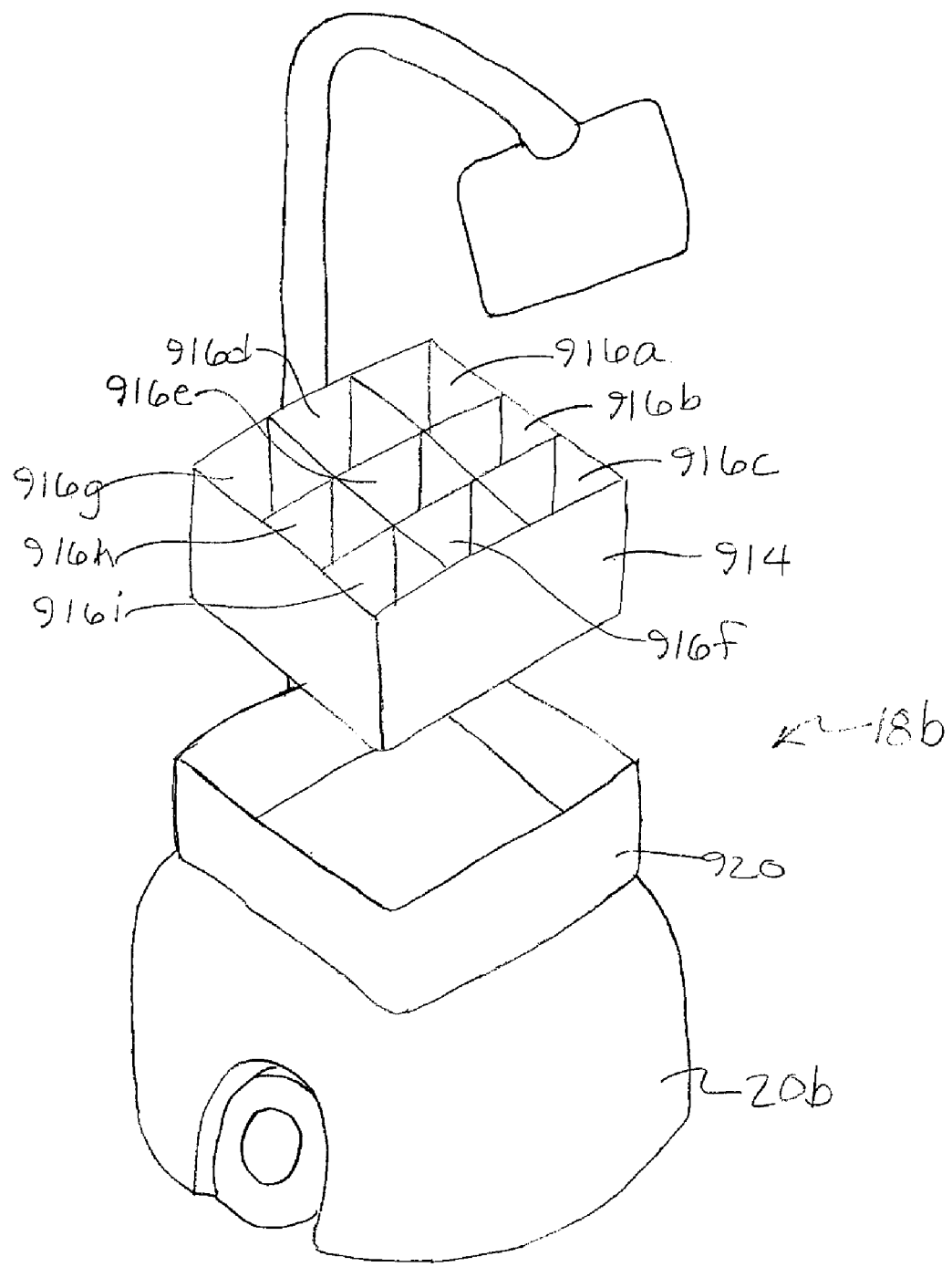
FIG. 9B is a schematic illustration of a further embodiment of a robot outfitted with putaway containers according to an aspect of the invention.

The totes/bins in the tote-array 910 may generally be smaller than the additional, larger tote and may be individual separate totes or bins that may be easily configured as an array or they may be pre-configured as an integrated array of totes/bins. The totes may be in any form, such as a slot, a bin, a compartment, container, or any other configuration. The totes may have openings facing upward or facing forward, rearward, or toward the side(s). The tote-array of totes may be arranged in any configuration, such as a single row of individual totes, two rows of individual totes, or any number of rows, columns, or layers of totes. Although the tote-array 910 is shown and described herein as being a vertically oriented "cubby" style array having openings on a vertical surface thereof for front/rear/side loading, it will be apparent in view of this disclosure that any style or configuration of tote-array, or combination thereof, can be used in accordance with various embodiments. The tote-array may be provided with removable or adjustable dividers to alter the configuration of totes within a tote-array. FIG. 9B illustrates a further example of a robot 18b that includes a tote-array 914 with a plurality of totes or bins 916a-i that are accessible from above through horizontal oriented openings. Although nine totes or bins are shown, it will be appreciated that any number of totes or bins can be provided. Furthermore, it will be apparent in view of this disclosure that tote-arrays can be disposed on, hung from, or otherwise be removably attached to the robot 18a. For example, in some embodiments, horizontally oriented totes (e.g., tote 920 as shown in FIG. 9A), stacked totes, and/or stacked divided totes configured for top loading can be used.

Figure 9C:
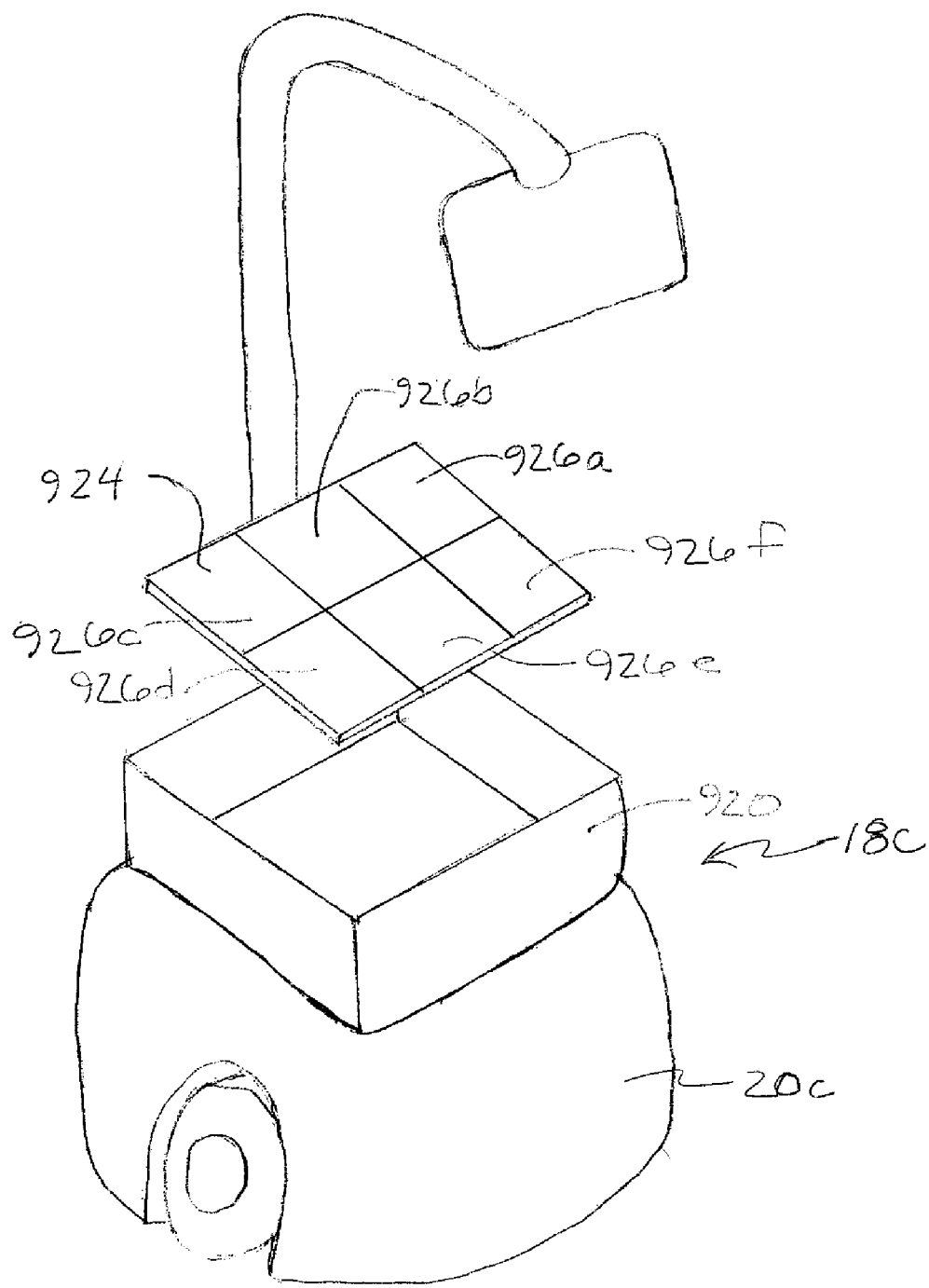
FIG. 9C is a schematic illustration of a still further embodiment of a robot outfitted with putaway containers according to an aspect of the invention.

FIG. 9C illustrates a robot 18c that includes a shelf 924 or other horizontal surface that may constitute a tote-array. The shelf or surface can be positioned above the upper surface of the wheeled base 20c of the robot 18c. In some embodiments, the shelf can be marked to designate a plurality of zones, such as zones 926a-f shown in FIG. 9C. Although six zones are shown, it will be appreciated that any number of demarcated zones, or no demarcated zones, can be provided. In some embodiments, the shelf 924 can be used to support one or more totes, bins, tote-arrays, or any other configuration to hold items. For example, a tote-array such as the tote-array 910 of FIG. 9A or the tote-array 914 of FIG. 9B can be supported on the shelf. The tote-array can be removably supported or can be fixedly supported on the shelf.

Each individual tote, including those in a tote-array may be identified with a tote identifier. Additionally, the tote-array as a whole may be identified with an array identifier. A shelf may be identified with a tote identifier, and/or each demarcated zone of a shelf may be identified with a tote-identifier. Similarly, any items to be put away (also referred to as "placed"), may be identified by an item identifier, for example, a barcode or other form of indicia, and/or the tote-array may include a barcode/indicia for the entire tote-array, as described in commonly owned U.S. Pat. No. 10,001,768, entitled Item Storage Array for a Mobile Base in Robot Assisted Order-Fulfillment Operations, incorporated by reference herein in its entirety. Identifier, whether an "item identifier," a "tote identifier," or an "array identifier" as used herein, refers to any scannable (interchangably "readable") marking, label, or device associated with identifying information corresponding to the item, tote, or array. For example, identifiers can take the form of a 1-d or 2-d barcode marking printed, etched, engraved, etc. on the item (or packaging thereof), tote, or array. Such identifiers may take the form of a label attached to the item (or packaging thereof), tote, or array and including a 1-d or 2-d barcode or an RFID chip. Such identifiers may also or alternatively include an RFID chip embedded within the item (or packaging thereof), tote, or array itself.

The identifier, in some embodiments, may be correlated to identifying information as simple as a UPC code or SKU. However, in a warehouse environment, the identifier may include more complex identifying information. For example, in some embodiments, the identifier may be a "license plate" storing unique information corresponding to the individual item, container, or array scanned/read by the scanner. As will be apparent to one of ordinary skill in the art in view of this disclosure, license plates can be serialized identifiers associated with information such as, for example, part numbers, UPC or SKU number, name, quantity, revision, serial number, date of manufacture, expiration date, lot number, geographic location and location history, locations for stocking this product within the current warehouse or facility, inventory status, subinventory, history of which organizations/companies have touched the item, tote, or array, history of which employees at each organization have handled the item, tote, or array, combinations thereof, and any other desired product information.

When the identifier used is a license plate, the mapping process to determine the pose in the warehouse to place the item may be simplified by mapping from the warehouse stocking location (rather than the SKU) contained in the license plate information to the pose. When mapping from the SKU, such as in connection with the picking process, described above with regard to FIG. 8, in step 504 the SKU number(s) of the items is/are determined by the warehouse management system 15, and from the SKU number(s), the bin location(s) is/are determined in step 506. Instead of mapping from the SKU to the bin location, the process may begin with the bin location directly. From the bin location, robot 18 may determine the fiducial ID's and from the fiducial ID's, the pose of each fiducial ID may be obtained.

Embodiments of the mobile robot used in connection with the invention may include a mobile base, laser-radar, and optical cameras, as described above. The robot may include a transceiver so that the robot can receive instructions from and transmit data to a warehouse management or other server. The robot may include a processor and memory to carry out various tasks and operations associated with navigation within the warehouse to navigate to fiducial markers placed on the shelves to put items away, as described above in conjunction with picking items from the shelves for order fulfillment. The robot may include a tablet or other display device or other input/output device for communication with an operator. For example, a display device 930 in communication with a processor may be configured to display information corresponding to an item to assist the operator in storing the item at its associated storage location.

Information associated with an item can include, for example and without limitation, one or more of bar code identification, item description, item size, item color, storage or bin location. The display device may also display operator prompts or messages during the put-away process, such as a message identifying a next item to be stored, or a prompt to confirm storage of an item and to select another item for storage, as described further below. The display device may provide other information as well, such as information relating to the robot's navigation around the warehouse. Such information may include regions within the warehouse, status indicators or icons of other robots, and the like. Suitable display devices are described in commonly owned U.S. Pat. No. 10,196,210, entitled Display for Improved Efficiency in Robot Assisted Order-Fulfillment Operations, incorporated by reference herein in its entirety.

When a delivery of items arrives at the warehouse, one or more operators unload the items at a suitable receiving location. An operator may then place a number of the items in a transitory location for subsequent placement into the totes of the tote-array of the mobile robot. For example, items may be placed in the additional larger tote/bin of the robot until it is filled or substantially filled. In other embodiments, the items may be placed in a bin on an additional mobile robot or mobile cart that can accompany the mobile robot or the items may be placed in bins at one or more other locations throughout the warehouse to which the mobile robot can return for subsequent refilling. In some embodiments, items from a delivery may be placed directly into the totes of the tote-array without first being placed in another transitory location. The items do not need to be scanned or sorted prior to placement in the large tote/bin on the mobile robot or at any other transitory location.

When the large tote/bin, or other transitory location, has been filled, the operator proceeds to fill each tote of the tote-array with an item. The operator may select the items at random from the large tote for subsequent placement in the totes of the tote-array. The operator may scan a bar code of the tote-array that identifies the number of totes in the tote-array or the operator may manually enter the number of totes in the tote-array. The operator next selects an item from the large tote/bin for placement in an individual tote in the tote-array of the robot. For example, if the robot has eight totes or slots on the tote-array, the operator selects eight items from the large tote. Items are identified with a bar code or other form of identification. The identification data includes at least the item's SKU. As described above, each item can be associated with a storage location in the warehouse, for example via a SKU-to-bin address lookup table, which can be stored, for example, in the memory of the robot. The operator scans the bar code of each item using the robot's scanner or a handheld scanner and places the scanned item in one of the individual totes in the tote-array of the robot. The operator may place the items in order into numbered totes, the robot may instruct the operator which tote to put the item in, or the operator may randomly place items it totes. The steps of placing items in the large tote and processing the items into the individual totes of the tote-array may occur at a same location, or the robot may move from a receiving location where the large tote has been filled to a processing location where the items are processed into the individual totes.

When all the individual totes have been filled, the robot can determine an optimal route for delivering each of the items to their respective storage locations. The optimized route can be determined using data from the WMS and order-server, as described above and discussed further below.

Figure 10:
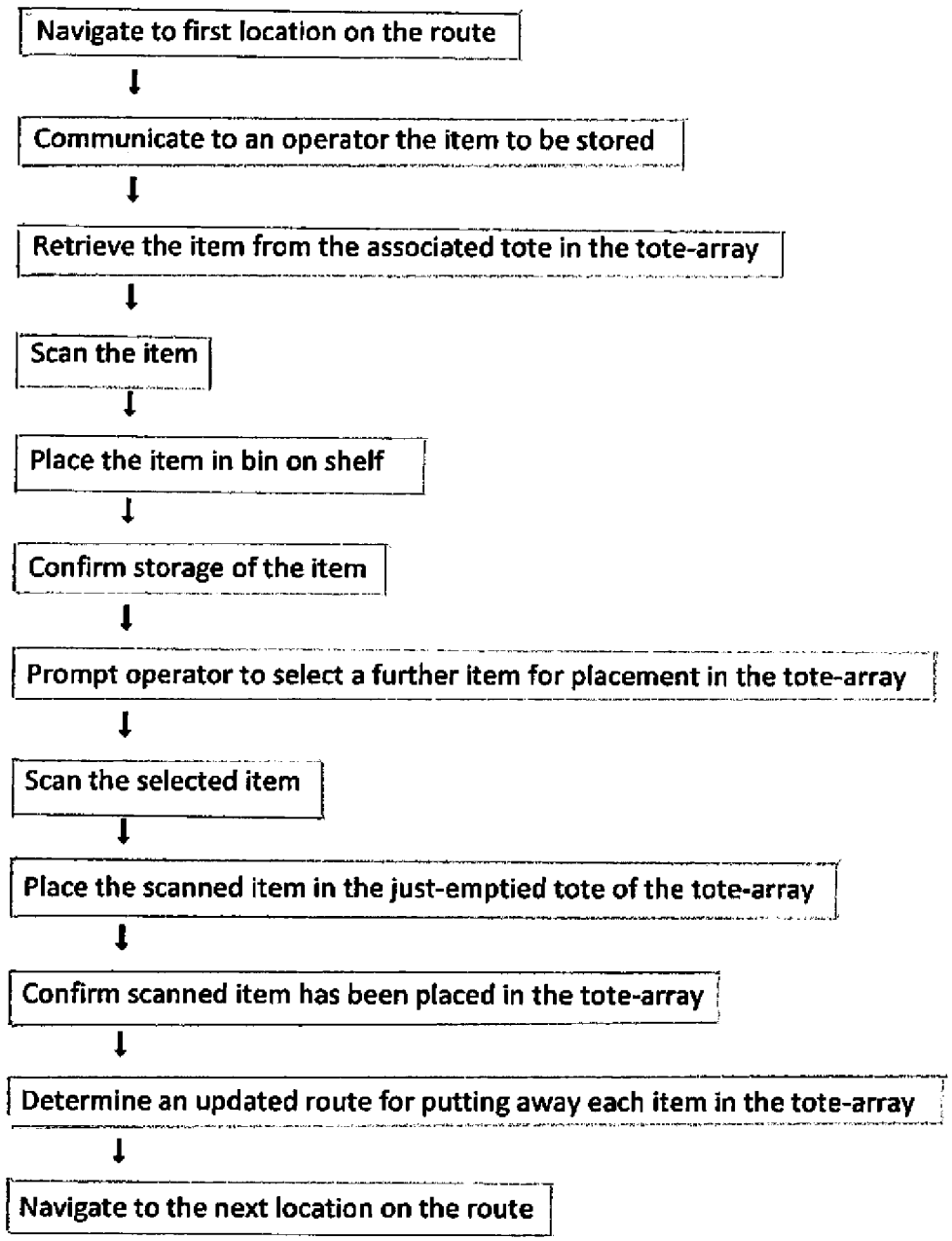
FIG. 10 is a flow chart depicting a process for putting items in storage.

Referring to FIG. 10, upon determining a route, the robot then travels to a first pose associated with a first location on the route, for example, by mapping the bin locations to the fiducials as described above. At the first location, the first item to be stored is communicated to the operator, for example, by displaying the individual tote identification number on the robot's tablet for the operator to see. The operator selects the item from the correct tote, scans the item using the robot's scanner or a hand-held scanner, places the item at the desired storage location, such as a bin on a shelf, and confirms that the item has been put away, for example, using the robot's tablet.

The tablet on the robot then prompts the operator to select a replacement item from the large tote, scan its barcode, and place the item in the just-emptied individual tote on the tote-array. The operator can select any item from the large tote. Once the replacement item has been scanned and placed in the tote, the operator confirms task completion on the robot's tablet. The robot then recalculates an updated route for the new set of items in the tote-array. It will be appreciated that the order in which the items in the individual totes are to be put away can change once an updated route has been calculated.

The robot then navigates to a next location on the updated route. At the next location, the next item is put away as described above. The operator at the next location then removes yet another item from the large tote, scans it, and places it in the now-empty individual tote. The robot recalculates the route once again based on the new set of items in the totes of the tote-array and navigates to the next location based on the updated route.

The process is repeated until all the items from the large tote have been placed in the individual totes. The robot then navigates to all the locations on the last updated route. When the last item in the tote-array has been placed in its storage location and the tote-array is empty, the robot may return to the receiving station to receive a new load of items, and the process can be repeated. When no items remain in the large tote, the operator may input this information to the robot via the tablet so that when the last item is stored the robot will know to return to an induction station, for example, to receive another assignment. In this manner, items can be dynamically sorted and the robots routed as efficiently as possible without the need to presort the items and without delaying or negatively impacting the efficiency of the human operators.

The mobile robot may include or be in communication with systems that assist with route planning and/or navigation in the warehouse. Any suitable route planning and/or navigation system may be used in connection with the invention described herein. It is, however, desirable to optimize route planning and navigation. In one example, the robot may communicate with a robot monitoring server that tracks congestion based on the presence of other robots or operators within the navigational space to improve navigation efficiency. In some circumstances, efficiency can be increased by clustering more than one robot in a particular area because it permits operators to efficiently perform multiple tasks while minimizing walking distance between robots. In other circumstances, where the cluster becomes too concentrated, a congested area can form, which can cause operators and robots to impede passage and travel speed of other operators and robots, causing inefficient delays and increasing collision risk. Any metrics or combination of metrics can be used to describe congestion conditions within the navigational space, such as, for example, one or more other robots proximate a particular location, a number of operators proximate a particular location, a combined number of robots and operators proximate a particular location, a number of manually disabled robots proximate a particular location, a number and type of non-robot, non-human objects, vehicles, or other obstructions proximate a particular location, dimensions of the navigational space proximate a particular location, or combinations thereof. In some embodiments, a robot may determine a route according to one or more efficiency factors in addition to or alternatively to congestion status. Such efficiency factors can include, for example, detection of at least one operator proximate a storage location, an operator-to-robot ratio in a region of the warehouse, proximity of an item to a previously-stored item, or combinations thereof. Efficiency factors can also include extended dwell times at a storage location while awaiting arrival of an operator to store the item. By considering such efficiency factors, the robot can improve storage efficiency by, for example, minimizing travel distance, minimizing travel time, minimizing likely dwell time of the robot at a location, avoiding obstacles or congested areas, or combinations thereof.

A robot may adjust the order of the putting items away while en route by skipping a previously scheduled item and selecting a subsequently scheduled item in the tote-array. If the next location is in a congested state, the robot can iterate with subsequently scheduled items in the tote-array and associated locations until a location in a more optimal state is detected. The robot can update the route to re-insert storage of the skipped item at a later time, prior to completing storage of all the items in the tote-array.

Examples of potentially applicable route planning/navigation approaches are described in the following commonly owned patent applications each of which is incorporated herein in its entirety: U.S. application Ser. No. 16/265,703, filed Feb. 1, 2019, entitled ROBOT CONGESTION MANAGEMENT; U.S. application Ser. No. 16/262,209, filed Jan. 30, 2019, entitled ROBOT DWELL TIME MINIMIZATION IN WAREHOUSE ORDER FULFILLMENT OPERATIONS; and U.S. application Ser. No. 17/017,758, filed on Sep. 11, 2020, entitled SEQUENCE ADJUSTMENT FOR EXECUTING FUNCTIONS ON ITEMS IN AN ORDER.

Non-Limiting Example Computing Devices

Figure 11:
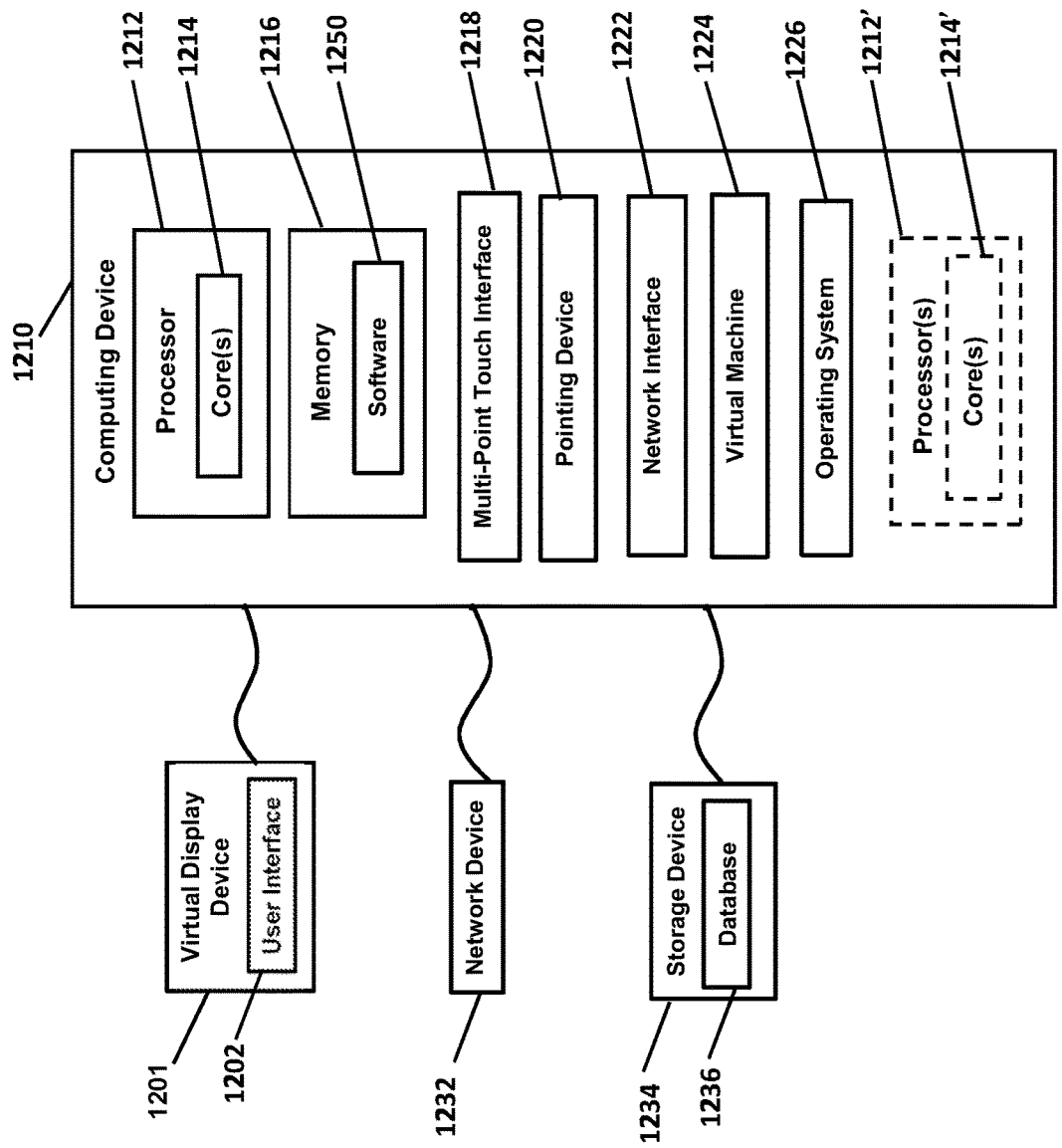
FIG. 11 is a block diagram of an exemplary computing system.

FIG. 11 is a block diagram of an exemplary computing device 1210 such as can be used, or portions thereof, in accordance with various embodiments as described above with reference to FIGS. 1-10. The computing device 1210 includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more flash drives), and the like. For example, memory 1216 included in the computing device 1210 can store computer-readable and computer-executable instructions or software for performing the operations disclosed herein. For example, the memory can store software application 1240 which is programmed to perform various of the disclosed operations as discussed with respect to FIGS. 1-101. The computing device 1210 can also include configurable and/or programmable processor 1212 and associated core 1214, and optionally, one or more additional configurable and/or programmable processing devices, e.g., processor(s) 1212' and associated core (s) 1214' (for example, in the case of computational devices having multiple processors/cores), for executing computer-readable and computer-executable instructions or software stored in the memory 1216 and other programs for controlling system hardware. Processor 1212 and processor(s) 1212' can each be a single core processor or multiple core (1214 and 1214') processor.

Virtualization can be employed in the computing device 1210 so that infrastructure and resources in the computing device can be shared dynamically. A virtual machine 1224 can be provided to handle a process running on multiple processors so that the process appears to be using only one computing resource rather than multiple computing resources. Multiple virtual machines can also be used with one processor.

Memory 1216 can include a computational device memory or random access memory, such as but not limited to DRAM, SRAM, EDO RAM, and the like. Memory 1216 can include other types of memory as well, or combinations thereof.

A user can interact with the computing device 1210 through a visual display device 1201, 111A-D, such as a computer monitor, which can display one or more user interfaces 1202 that can be provided in accordance with exemplary embodiments. The computing device 1210 can include other I/O devices for receiving input from a user, for example, a keyboard or any suitable multi-point touch interface 1218, a pointing device 1220 (e.g., a mouse). The keyboard 1218 and the pointing device 1220 can be coupled to the visual display device 1201. The computing device 1210 can include other suitable conventional I/O peripherals.

The computing device 1210 can also include one or more storage devices 1234, such as but not limited to a hard-drive, CD-ROM, or other computer readable media, for storing data and computer-readable instructions and/or software that perform operations disclosed herein. Exemplary storage device 1234 can also store one or more databases for storing any suitable information required to implement exemplary embodiments. The databases can be updated manually or automatically at any suitable time to add, delete, and/or update one or more items in the databases.

The computing device 1210 can include a network interface 1222 configured to interface via one or more network devices 1232 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 1222 can include a built-in network adapter, network interface card, PCMCIA network card, card bus network adapter, wireless network adapter, USB network adapter, modem or any other device suitable for interfacing the computing device 1210 to any type of network capable of communication and performing the operations described herein. Moreover, the computing device 1210 can be any computational device, such as a workstation, desktop computer, server, laptop, handheld computer, tablet computer, or other form of computing or telecommunications device that is capable of communication and that has sufficient processor power and memory capacity to perform the operations described herein.

The computing device 1210 can run any operating system 1226, such as any of the versions of the Microsoft® Windows® operating systems (Microsoft, Redmond, Wash.), the different releases of the Unix and Linux operating systems, any version of the MAC OS® (Apple, Inc., Cupertino, Calif.) operating system for Macintosh computers, any embedded operating system, any real-time operating system, any open source operating system, any proprietary operating system, or any other operating system capable of running on the computing device and performing the operations described herein. In exemplary embodiments, the operating system 1226 can be run in native mode or emulated mode. In an exemplary embodiment, the operating system 1226 can be run on one or more cloud machine instances.

Figure 12:
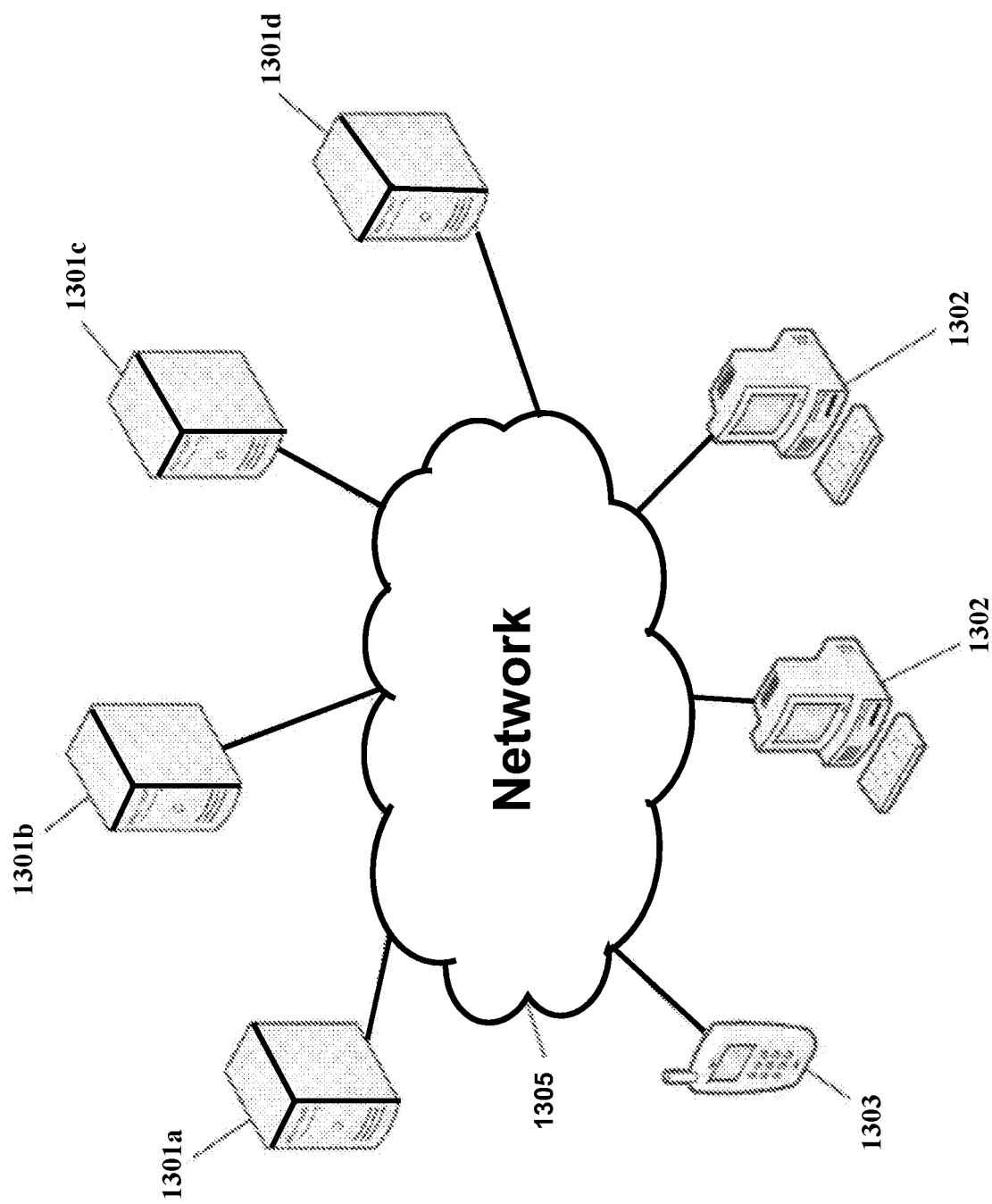
FIG. 12 is a network diagram of an exemplary distributed network.

FIG. 12 is an example computational device block diagram of certain distributed embodiments. Although FIGS. 1-10, and portions of the exemplary discussion above, make reference to a warehouse management system 15, order-server 14, or robot tracking server 902 each operating on an individual or common computing device, one will recognize that any one of the warehouse management system 15, the order-server 14, or the robot tracking server 902 may instead be distributed across a network 1305 in separate server systems 1301a-d and possibly in user systems, such as kiosk, desktop computer device 1302, or mobile computer device 1303. For example, the order-server 14 may be distributed amongst the tablets 48 of the robots 18. In some distributed systems, modules of any one or more of the warehouse management system software and/or the order-server software can be separately located on server systems 1301a-d and can be in communication with one another across the network 1305.

While the foregoing description of the invention enables one of ordinary skill to make and use what is considered presently to be the best mode thereof, those of ordinary skill will understand and appreciate the existence of variations, combinations, and equivalents of the specific embodiments and examples herein. The above-described embodiments of the present invention are intended to be examples only. Alterations, modifications and variations may be effected to the particular embodiments by those of skill in the art without departing from the scope of the invention, which is defined solely by the claims appended hereto. The invention is therefore not limited by the above described embodiments and examples.

Having described the invention, and a preferred embodiment thereof, what is claimed as new and secured by Letters Patent is:

1. A process for placing items at storage locations in an environment, comprising:
   providing an autonomous robot comprising a mobile base and having a tote-array including a plurality of totes disposed on the mobile base, each tote in the tote-array holding an item to be stored at a storage location;

determining a route to deliver each of the items in the tote-array to an associated storage location;

navigating the robot to a first storage location for placement of a first item of the items in the tote-array;

placing the first item at the first storage location;

obtaining a further item, scanning the further item, and placing the further item in the tote from which the first item was removed; and determining an updated route to deliver each of the scanned items in the tote-array, including the scanned further item, to the associated storage locations.

2. The process of claim 1, wherein the step of providing an autonomous robot further comprises:

obtaining a plurality of items to be stored;

scanning a portion of the plurality of items to be stored; and placing each of the scanned items in one of the plurality of totes of the tote-array.

3. The process of claim 1, wherein the autonomous robot further includes an additional tote disposed on the mobile base holding a plurality of items for subsequent placement in the tote-array, the method further comprising: obtaining the further item from the additional tote.

4. The process of claim 3, wherein the plurality of items held by the additional tote for subsequent placement in the tote-array are unsorted.

5. The process of claim 1, further comprising:

navigating the robot to a next storage location on the updated route for placement of a second item of the scanned items;

placing the second item at the next storage location;

obtaining another item, scanning the another item, and placing the another item in the tote from which the second item was removed; and determining an updated route to deliver each of the scanned items in the tote-array, including the scanned another item, to the associated storage locations.

6. The process of claim 1, wherein the step of navigating the robot to a first storage location further comprises navigating the robot to a pose associated with the first storage location.

7. The process of claim 1, further comprising displaying, by the robot, an identification of a tote of the tote-array holding the first item to be placed at its storage location.

8. The process of claim 1, further comprising confirming placement of the first item at the first storage location.

9. The process of claim 1, wherein the environment is a warehouse space containing items for customer order fulfillment.

10. A robot capable of navigating to predefined locations in an environment, the robot comprising:

a mobile base, a tote-array of a plurality of totes supported on the mobile base;

a communication device enabling communication between the robot and a management system; and a processor and memory, responsive to communications with the management system, configured to:

determine a route to deliver each of the items in the tote-array to associated storage locations;

navigate to a first storage location for placement of a first item of the items in the tote-array;

receive confirmation of placement of the first item in the first storage location;

receive identification of a further item for placement in the tote of the tote-array previously occupied by the first item; and determine an updated route to deliver each of the items in the tote-array to associated storage locations.

11. The robot of claim 10, further comprising an additional tote supported on the mobile base for configured to hold a plurality of items for subsequent placement in the tote-array.

12. The robot of claim 10, further comprising a scanner operative to scan the items for placement in the in the tote-array.

13. The robot of claim 10, further comprising a display device for communication with an operator.

14. The robot of claim 10, wherein the robot is further configured to navigate to the updated route.

15. The robot of claim 10, wherein the processor is configured to communicate an identification of the first item for placement at the first storage location to an operator.

* * * * *